UNITED STATES PATENT OFFICE.

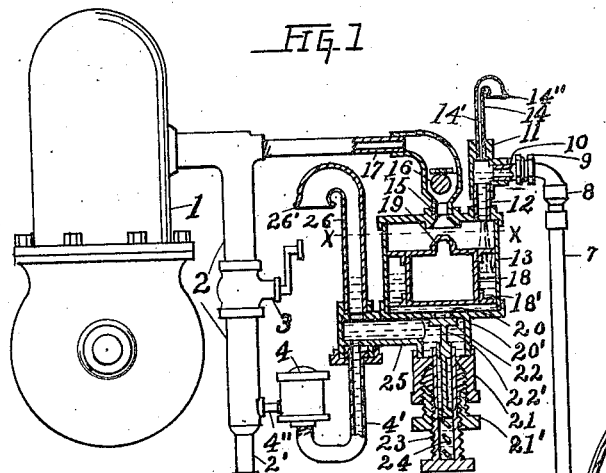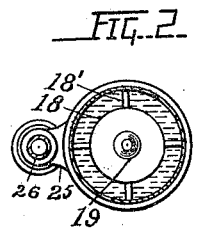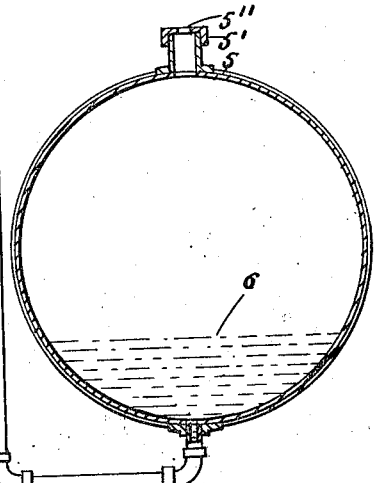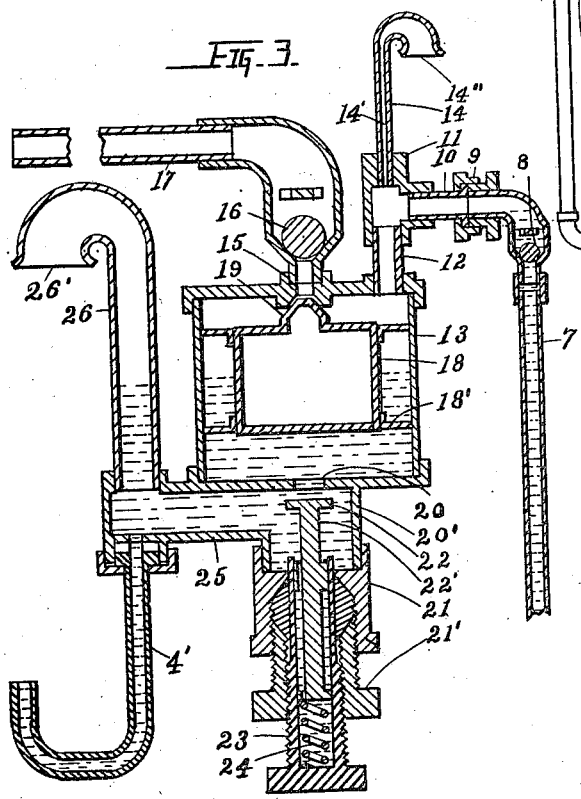

COSBY D. MILLER, OF ST. JOSEPH, MISSOURI.

AUTOMATIC FUEL-FEEDER FOR INTERNAL-COMBUSTION ENGINES.

1,147,336.  Specification of Letters Patent.  Patented July 20, 1915.

Application filed March 9, 1915. Serial No. 13,234.

*To all whom it may concern:*

Be it known that I, COSBY D. MILLER, a citizen of the United States, residing at St. Joseph, in the county of Buchanan and State of Missouri, have invented certain new and useful Improvements in Automatic Fuel-Feeders for Internal-Combustion Engines, of which the following is a specification, reference being had therein to the accompanying drawing.

My invention relates to improvements in liquid fuel feeders for feeding fuel into internal combustion engines, the objects of which are, first, to provide a feeder of this class, which shall feed liquid fuel into the carbureter of an internal combustion engine, under an unfluctuating predetermined pressure, and do the same from a source of fuel supply, the height of which is varied in its relation to the height of said feeder, as is caused by varying road grades, in the operation of an automobile; second, to so construct a feeder of this class, that the pressure of the fed fuel shall be uniformly maintained, regardless of the speed of the engine, even though the speed of said engine be extremely slow; third, to so simplify the construction of the feeder, that there shall be practically no frictional resistance to the movements of the moving parts, thereby reducing fluctuation in the pressure of the fed fuel and also reducing wear of the moving parts, to such minimum, as is negligible; fourth, to so construct and arrange the parts of the feeder that practically all of the fuel vapor formed therein, is directed into said engine, thus utilizing said vapor and providing a fuel feeder, by the use of which fluctuation in the speed of said engine is avoided, even though said speed be extremely slow; fifth, to so construct the parts of a fuel feeder of this class, that fuel can not gravitate from the feeder, through its pipe connections, into the fuel supply tank, even though the check valve in said connections be leaky; thus insuring a certain amount of fuel shall always be in said feeder, ready for immediate use. I attain these objects by the mechanism illustrated in the accompanying drawings, in which:—

Figure 1 is a section of the feeder and of the fuel tank cut through their centers and a side elevation of an engine and carbureter connected therewith. Fig. 2 is a horizontal section of the feeder, on the line X X, seen in Fig. 1, looking downward. Fig. 3 is an enlarged section, similar to Fig. 1, of the fuel feeder.

Engine 1, (see Fig. 1,) is provided with fuel intake pipe 2, having the reduced air intake end 2' formed therewith. Said pipe is provided with throttle 3 in the central portion thereof, and has carbureter 4 connected therewith, between said throttle and said reduced end. Fuel tank 5 is adapted to hold liquid fuel 6, which is conducted therefrom through pipe 7, to the hereinafter described fuel feeder. Said tank is provided with a fill cap 5', which has vent aperture 5" formed therethrough. Since said engine, its intake pipe, said throttle, said fuel tank and its fuel conducting pipe may be of any well known forms, now generally in use, and do not form elements of this invention, the same are neither fully shown nor described.

The upper end of fuel pipe 7 is provided with check valve 8, for preventing back flow of fuel therethrough. Said valve is connected by union 9, with nipple 10, which is connected with the side opening of the T shaped fitting 11. The bottom opening of said fitting is connected by nipple 12, with float chamber 13. The upper opening of said fitting is connected with vent tube 14, which has a small bore 14' formed therethrough.

Air outlet opening 15 is formed through the center of the top of said float chamber. The transverse area of said outlet opening is much greater than the like area of bore 14'. Said outlet opening has check valve 16 connected therewith, for preventing back flow of air therethrough. Said air outlet check valve is connected by pipe 17, with engine intake pipe 2, at a point between engine 1 and throttle 3.

Float 18 is provided with guides 18', by which said float is vertically guided in chamber 13. Said float has valve 19 formed on the center of the top thereof, for adjustably closing opening 15, the adjustment of said valve being regulated automatically, by the vertical movement of said float. Chamber 13 has fuel outlet opening 20 formed through the bottom thereof, and valve chamber 20' formed therewith, which latter communicates with said opening. Packing box 21 is connected with the bottom of said valve chamber. Said box is provided with packing compressor 21', screwed into the lower end portion thereof. Fuel outlet valve 22 is adapted to close said outlet opening. Said valve is secured on the upper end of valve stem 22'. The lower end portion of said stem is vertically guided in hollow stem guide 23, which is screwed through the center of said packing compressor, and extends thereabove, through said packing box, into said outlet valve chamber. Spring 24 is placed in said hollow stem guide, below said stem for upwardly moving said stem and the thereon carried valve. Said stem guide is adjustably screwed through said packing compressor for adjusting the tension of said spring.

Fuel conduit 25 has its inner end connected with valve chamber 20', while its outer end extends beyond the side of chamber 13. The upper side of the extended portion of said conduit is connected with the lower end of stand pipe 26, the upper end of which is open and terminates at a point higher than the top of float chamber 13. The upper end of carbureter feed pipe 4' is connected with said conduit, opposite the connection therewith of said stand pipe, while the lower end of said feed pipe is connected with carbureter 4. Said carbureter is connected by pipe 4'', with engine intake pipe 2, at a point between intake end 2' and throttle 3.

In installation and operation of the described fuel feeder, pipe 4' is formed of such length as will cause a certain desired static fuel pressure at its lower end, and the tension of spring 24 is so adjusted that the gravity of valve stem 22' and the thereon carried valve 22 is only slightly overcome, for providing fuel outlet means, that will be opened by static pressure of fuel in chamber 13, upon the slightest rise of said pressure above the static pressure of fuel in valve chamber 20'. This adjustment of said spring permits ready flow of fuel from float chamber 13, through opening 20, valve chamber 20' and conduit 25, into stand pipe 26, for equalizing the height of the fuel in said chamber and stand pipe.

With the parts in the position seen in Fig. 1, engine 1 draws air from chamber 13 through its described pipe connections, while at the same time a much less volume of air enters said chamber, thus forming a partial vacuum therein. While this is done, back flow of fuel from valve chamber 20', through opening 20, is prevented by valve 22. While said partial vacuum exists in chamber 13, air enters tank 5, through vent aperture 5'', thus maintaining atmospheric pressure upon the liquid fuel 6, that is contained in said tank. This atmospheric pressure forces fuel from said tank, into chamber 13, through their previously described fuel pipe connections. This flow of fuel into chamber 13, continues until the fuel in said chamber raises float 18 and the thereon carried valve 19, from the position seen in Fig. 1, to the position seen in Fig. 3. While said valve is in the last mentioned position, it will be understood that the transverse area of opening 15, around said valve equals the like area of bore 14', and that said bore admits into said chamber a volume of air which equals the volume of air passing therefrom through the thus reduced opening 15, thereby maintaining in chamber 13, a partial vacuum which is very slightly below atmospheric pressure. While such is done, the thus formed auxiliary air inlet continually admits a very small volume of air into manifold pipe 2, which slightly reduces the richness of the fuel mixture in said pipe. In actual practice said mixture is generally too rich and the admission of auxiliary air adds to the efficiency of the fuel. This is invariably the condition, when the engine 1 is running at slow speed.

Should the richness of the mixture need further adjustment than the thus admitted auxiliary air provides, the same is accomplished, by adjusting the carbureter 4, in the usual, well known manner, and since the parts of said carbureter are not original elements of my invention, the adjusting parts of the same, are neither shown nor described. While the parts are in this position, the static pressure of the fuel in said chamber, opens valve 22, upon which fuel passes through opening 20, until the height of the fuel in said chamber is lowered to the level of the height of the thus raised fuel in stand pipe 26. This movement of fuel, lowers float 18 and the thereon carried valve 19, thereby increasing the area of air outlet opening 15, upon which the previously described vacuum producing operation and flow of fuel incident thereto, take place.

It will be understood, that for clearness of elucidation, the vertical movement of float 18 and the thereon carried valve 19, has been exaggerated, and that in actual operation, they do not gravitate to as low a point as the same are seen in Fig. 1.

Fuel gravitates from stand pipe 26 through the extended end of conduit 25 and through pipe 4', into carbureter 4, from whence said fuel passes into intake pipe 2, through pipe 4'', for use in engine 1, in the usual well known manner. This usage of fuel slightly lowers the level of the same, in said stand pipe, upon which the level of said fuel is again raised to practically the same level, as the height of the fuel in float chamber 13, as previously described.

It will be understood that the automatic action of valves 22 and 19, as previously described, is such that the fluctuations in the height of the fuel in said float chamber and in said stand pipe are thereby reduced to such minimum, that said fluctuations are imperceptible.

It will be seen by referring to Figs. 1 and 2, that all of the vapor arising from the fuel in chamber 13, passes therefrom, through the previously described air conducting means, into engine 1, thus utilizing said vapor.

Should the speed of engine 1 be suddenly and greatly increased, while the parts are in the position seen in Fig. 3, thereby causing sudden and violent exhaustion of air from chamber 13, and further flow of fuel into said chamber, float 18 and the thereon carried valve 19 would thereby be raised, still further reducing the said area of opening 15, in accordance with the speed of said engine. When this is done, the air passing through bore 14' again fills the thus formed partial vacuum, and the previously described flow of fuel from chamber 13 is repeated, thus at all times maintaining the height of fuel in said chamber at practically one point.

Having fully described my invention, what I claim as new and desire to secure by Letters Patent, is:—

1. The combination with a float chamber having an air outlet opening through the top thereof and a fuel outlet opening through its bottom and having an air inlet opening into the top of said float chamber; of a float in said chamber said float being vertically guided beneath said air outlet opening; a valve connected with and carried on the center of the top of said float for adjustably reducing the area of said outlet opening and thereby regulating the same; liquid inducting means adjustably controlled by said valve for drawing liquid fuel into said float chamber from a source of supply said fuel being adapted to raise said float and the thereon regulating valve whereby said inducting means is regulated upon the slightest movement of said float and said inducted fuel is maintained at practically one height in said float chamber; outlet closing means for closing said outlet opening said closing means being adapted to be opened by static pressure of said inducted fuel; air conducting means whereby atmospheric pressure is conducted onto the fuel which has passed through said outlet opening; and fuel conducting means whereby the last mentioned fuel is conducted to a predetermined lower level.

2. In a fuel feeder of the class described, the combination with a float chamber having an air outlet opening through the top thereof and a fuel outlet opening through its bottom; of a fuel supply tank below the level of said float chamber; fuel conducting means having its lower extremity connected with the bottom of said fuel tank and its upper end portion opening downward into the top of said float chamber for preventing backward leaking of fuel therethrough from said float chamber; an air inlet tube connected with said upper end portion of said fuel conducting means, said tube having an extremely small bore therethrough; a non-return valve in said fuel conducting means; automatically regulated fuel inducting means whereby liquid fuel is drawn from said tank through said fuel conducting means into the top of said float chamber; fuel outlet means controlled by the static pressure of said inducted fuel for controlling outflow of fuel through said outlet opening; and fuel conducting means whereby fuel is conducted from said outlet opening to a predetermined lower level.

3. The combination with a float chamber having an air outlet opening through the top thereof and a liquid fuel outlet opening through its bottom; of fuel conducting means adapted to conduct liquid fuel from a source of supply into the top of said float chamber; air pumping means connected with said air outlet opening for pumping air from said float chamber; reduced air inlet means for admitting a smaller volume of air into said float chamber than is normally pumped therefrom thereby forming a partial vacuum in said float chamber for induction of fuel into said chamber; a float in said chamber guided by the wall thereof for vertical movement in said chamber; a regulating valve formed with and carried on the top of said float whereby the area of said air outlet opening is regulated to varying amounts upon the slightest movement of said float; a non-return valve for said fuel outlet opening; elastic closing means for said non-return valve; adjusting means accessible from outside of said feeder whereby said elastic closing means is so adjusted that the static fuel pressure upon said valve opens the same when a small amount less than full atmospheric pressure is exerted upon said fuel; air conducting means whereby atmospheric pressure is conducted onto the fuel which has passed through said fuel outlet opening; and fuel conducting means whereby the last mentioned fuel is conducted to a predetermined lower level.

In testimony whereof I affix my signature in the presence of two witnesses.

COSBY D. MILLER.

Witnesses:
 MATTHEW B. HINTON,
 JOHN J. HINTON.